3,060,099
COMPLEX POLYSACCHARIDE, ACTINOGAN, AND PREPARATION THEREOF
Henry Schmitz, Syracuse, Irving R. Hooper and Joseph Lein, Fayetteville, and Bernard Heinemann, Dewitt, N.Y., assignors to Bristol-Myers Company, New York, N.Y., a corporation of Delaware
No Drawing. Filed June 8, 1960, Ser. No. 31,508
4 Claims. (Cl. 195—11)

This invention relates to a new and useful complex polysaccharide, called actinogan, and to its production. More particularly it relates to processes for its production by fermentation and to methods for its recovery and purification. The invention embraces this compound in dilute solutions, as crude concentrates and as purified solids. The compound is useful in the medical sciences in therapy, e.g., to increase the resistance of the host to infection, in animal experimentation and as a tool for the study of certain phenomena such as the defense mechanism of the host and antibody formation.

There is now provided, according to the present invention, a complex polysaccharide identified as actinogan which is produced by the process of cultivating the microorganism ATCC 13748 under submerged aerobic conditions in an aqueous carbohydrate solution containing a nitrogenous nutrient, preferably for at least 12 hours, and then, if desired, recovering the so-produced polysaccharide from the fermentation broth.

A culture of the organism producing the polysaccharide of the present invention has been deposited in the American Type Culture Collection, Washington, D.C., and added to its permanent collection of microorganisms as ATCC 13748. Actinomycete ATCC 13748 is characterized by the development of moderate to abundant substratal growth which readily fragments into rod-like elements. Failure to form aerial mycelium on a wide variety of media is also characteristic of this culture. Initial growth is colorless to white, soft and moist. As the culture ages, the growth becomes dirty white to greyish-tan, raised, nodular to plicate, of a doughy to leathery consistency and the margin becomes filamentous. A pale yellow to light brown soluble pigment may be formed in protein media. Occasionally, old cultures develop small isolated patches or sectors of a very thin, velvety, white to light grey efflorescence on certain media. Abundant growth occurs at 22–37° C. Limited growth is attained at 42–45° C. No growth takes place at 50° C. The substratal growth is filiform, breaking up into short rods 0.7–6.0 x 0.5–0.7$\mu$ within 2–3 days. Frequently, the smaller rods develop polar swellings thus giving the illusion of paired cocci.

*Growth characteristics and biochemical reactions.* — The following growth characteristics are observed on various media at 28° C. for 14 days. Unless otherwise noted, all culture descriptions are based on observations of confluent growth obtained by cross-hatch inoculation of a nutrient agar surface with actively growing vegetative cells. Inoculum preparation is made by growing the culture in tryptone-yeast extract broth on a rotary shaker for 48 hours at 26±1° C.

Tomato paste oatmeal agar:
Substratal growth—abundant, greyish-tan Moonmist (Plate 12A–2) (capitalized color names and plates refer to those used in Dictionary of Color by Maerz and Paul, Ed. 2, New York, McGraw-Hill Book Co., Inc., 1950) to Piping Rock (Plate 13A–2), plicate, doughy to leathery.
Aerial mycelium—absent, occasionally small patches and/or sectors of a thin, white efflorescence may develop.
Reverse—brown Owl (Plate 16A–9).
Soluble pigment—light brown.
Giant colony—greyish-brown, flat to raised, plicate with radial furrows, center frequently elevated into a point, undulate margin, doughy to leathery, colony firmly attached to the substrate.

Bennett's agar:
Substratal growth—moderate to abundant, colorless to pale yellow-orange to pale yellow-tan (Plate 9F–2) to Ecru Beige (Plate 11C–2), doughy, nodular to honeycomb (many thin anastomosing ridges and folds).
Aerial mycelium—absent.
Reverse — colorless to pale yellow-orange Chamois (Plate 11I–5).
Soluble pigment—pale yellow-orange.
Giant colony—colorless to pale yellow-tan, raised, honeycomb surface, undulate margin, doughy, growth usually not firmly attached to the substrate.

Hickey and Tresner's agar:
Substratal growth—abundant, colorless to pale tan Ecru Beige (Plate 11C–2), leathery, plicate.
Aerial mycelium—absent.
Reverse—various shades of tan (Plate 11E–3).
Soluble pigment—very faint brown.

Czapek's solution agar:
Substratal growth — poor, colorless to white, flat, smooth to slightly nodular, filamentous.
Aerial mycelium—absent.
Reverse—colorless.
Soluble pigment—absent.

Inorganic salts-starch agar:
Substratal growth—moderate, off-white to pale dirty yellow Oyster White+ (Plate 10B–1), doughy to leathery, nodular to plicate.
Aerial mycelium—absent.
Reverse—off-white to pale greenish-yellow Marguerite Yellow (Plate 10C–1).
Soluble pigment—absent.
Remarks—medium cleared (2–3 mm. zone).

Yeast extract agar: Similar to growth on Bennett's Agar.

Dextrose-tryptone agar: Similar to growth on Bennett's Agar.

Glycerol asparagine agar:
Substratal growth—moderate, pale orange Leghorn (Plate 10D–3), smooth to slightly roughened, leathery.
Aerial mycelium—absent.
Reverse—pale tan Ecru Beige (Plate 11C–2).
Soluble pigment—absent.

Dextrose asparagine agar:
Substratal growth—moderate, off-white to pale organge-brown Caramel (Plate 12F–10), rough to greatly folded (honeycomb), doughy to leathery.
Aerial mycelium—absent.
Reverse—off-white to pale orange-brown Caramel.
Soluble pigment—very light brown.

Casein agar (skim milk):
Substratal growth—moderate to abundant, white to pale yellow-tan, soft, moist, slightly roughened to nodular, edge nonfilamentous.

Aerial mycelium—absent.
Reverse—yellow-orange Chamois (Plate 11I–5).
Soluble pigment—pale yellow.
Remarks—positive hydrolysis of casein 3–5 mm. clear zone after three days with complete clearing of substrate after 7–10 days.

Tyrosine agar:

Substratal growth — moderate, greyish-tan Cracker (Plate 13D–6), nodular to plicate, doughy.
Aerial mycelium—absent, occasionally small patches and/or sectors of a thin white to light grey efflorescence may develop on the surface of the substratal growth.
Reverse — dark reddish-brown Chippendale (Plate 8H–5).
Soluble pigment — substrate becomes colored a dark reddish-brown.
Remarks—tyrosine crystals dissolved.

Acid from carbohydrates:
    Xylose, no growth
    Lactose, no growth
    Maltose, positive
    Mannose, positive Citrated sheep blood agar:

Growth abundant, no aerial mycelium, no soluble pigment.
Blood hemolysis—weak positive after 72 hours (1–2 mm. zone).

Carbon utilization:

On Pridham's inorganic agar as the basal medium, growth was observed at 28° C. in 10 days with the following as sole carbon sources: glucose, galactose, fructose, maltose, d-mannitol, sorbitol, dextrin, starch, glycerol, inositol, sodium citrate (poor), and sodium succinate (poor). No growth was observed on rhamnose, sucrose, lactose, xylose, raffinose, cellobiose, inulin, dulcitol, sodium acetate, sodium oxalate, sodium salicylate, and sodium tartrate.

The production of the compound of the present invention by fermentation and its subsequent recovery and purification were followed by an in vivo anti-tumor assay using Sarcoma–180 (S–180) in mice. The method follows closely those described by D. A. Clarke ("Mouse Sarcoma 180," Cancer Research, Suppl. No. 3, pp. 14–17, 1955). The in vivo S–180 tests are performed using a basic experimental group of 50 mice implanted with fragments of uniform size (ca. 2 mm.³) from a single donor tumor. These 50 mice are always of the same strain (Swiss-Webster), sex, farm source and weight (20±2 g.). They are assorted among 8 therapy sets of 5 animals each and one control set of 10 animals. The therapy mice are injected intraperitoneally with candidate antitumor agents starting 24 hours after tumor implantation and continuing twice daily for a total of 13 injections. Dilutions of broths or suspensions of solids are administered in a uniform volume of 0.5 ml. Locke-Ringer saline. The 10 control mice receive 13 injections of Locke-Ringer saline only. On the 8th day after implantation, the tumor sizes are evaluated by measuring the mass through the skin of the animal in its longest dimension and the perpendicular to it with vernier calipers. The average diameter (A.D.) of the tumors of the treated animals is determined and compared to that of controls. The treated/control ratio (T/C) of these average diameters is calculated so that significance of inhibition by therapy can be ascertained. A thorough statistical study has suggested T/C=0.75 as a useful maximum cut-off point for activity. In order to observe any possible delayed effects the animals are in some cases retained for several weeks after cessation of therapy to determine the fate of the tumor. In nearly all instances tumors inhibited due to therapy resume growth and rapidly catch up to the controls in size. On rare occasions regression of tumors with complete cure of the animal occurs as a result of therapy. The spontaneous regression rate is 5–10% for S–180; the remaining tumors grow rapidly and kill the host animal in about 3 weeks' time. The best available anti-tumor agents can cause better than 50% complete regressions among treated mice with this tumor.

The substance of the present invention exhibits no antibacterial activity.

It is to be understood that for the production of the polysaccharide this invention is not limited to this particular microorganism but particularly includes the use of microorganisms which are natural isolates, variants or mutants produced from the described organism by mutating agents such as X-radiation, ultraviolet radiation and nitrogen mustards.

In the submerged, aerobic fermentation of the organism to produce the new polysaccharide, the carbohydrate solution used contains as a source of carbon a commercially available sugar, other carbohydrate or glyceride oil and as a source of nitrogen inorganic salts such as ammonium sulfate and sodium nitrate and organic materials, often in crude form, such as corn steep liquor, distillers' solubles, yeast, soybean meal and when desired mineral salts and buffering agents such as calcium carbonate; such medium ingredients include those listed in Canadian Patent 513,324 and in British Patents 736,325 and 730,341 and in United States Patents 2,691,618; 2,658,018; 2,653,899; 2,586,762; 2,516,080; 2,483,892; 2,609,329; 2,709,672; 2,723,216 and 2,757,123.

The following examples illustrate the preparation of fermentation broths containing the antibiotic.

EXAMPLE 1

Media (1, 2) were dispensed in 100 ml. amounts in 500 ml. Erlenmeyer flasks and autoclaved 30 minutes at 15 pounds. Thirty-hour vegetative growth of American Type Culture Collection 31748 was used as inoculum at rate of 2%. Fermentations were performed at 27° C. on a rotary shaker. The anti-tumor activity of shake-flask fermented broth at 72 hours vs. S–180 at 32×:T/C=0.55.

|  | Percent |
|---|---|
| (1) Inoculum medium: | |
|   Glucose | 2.0 |
|   (NH$_4$)$_2$SO$_4$ | 0.3 |
|   ZnSO$_4$·7H$_2$O | 0.003 |
|   Cornsteep | 1 (v./v.) |
|   Pharmamedia | 1 |
|   CaCO$_3$ | 1 |
| (2) Production medium: | |
|   Cerelose | 3 |
|   NaCl | 0.5 |
|   Soybean meal | 3 |
|   CaCO$_3$ | 0.3 |

EXAMPLE 2

In an example of tank (1000 gal. fermenter) fermentation by American Type Culture Collection 13748 the same conditions of media, temperature and inoculum were used as for shake flask fermentation. Anti-tumor activity of tank fermented broth at 70 hours vs. S–180 at 64×T/C=0.37.

64× means that the broth was tested after dilution with 63 volumes of buffer.

It was found that the active principle, actinogan, was precipitated by acetone or ammonium sulfate. Charcoal (one percent) did not remove the activity nor did the carboxylic cation exchange resin IRC–50 (Na). Amberlite IRC–50 is a commercially available cation exchange resin of the carboxylic type; it is a copolymer of methacrylic acid and divinyl benzene wherein the divinyl benzene constitutes 2½ to 5% of the resin composition;

United States Patent No. 2,340,111. Zinc chloride precipitated inactive impurities but protamine gave an active solid. The activity did not dialyze through cellulose acetate membranes.

Precipitation at various pH values gave active precipitates and supernatants with an indication of maximum insolubility at pH 9.5.

Active precipitates from either four volumes of acetone or saturated ammonium sulfate were digested with methanol, the insoluble portion dissolved in water and dialyzed and the resulting solution fractionally precipitated by the addition of alcohol. This solid was active vs. S–180 at 8 mkd. (T/C=0.54) but showed no in vitro activity versus *B. subtilis* at pH 6 or 8, *Staph. aureus* or *E. coli* nor on spectrum plates at 10 or 50 mg./ml. Ultraviolet absorption shows a wide shoulder between 260–280 mu.

Acetone powders were purified by repeated passage through Sephadex G25, G50 and G75. These are commercially available cross-linked dextran polymers which form gels with water and act as molecular sieves, said to absorb polyglucose molecules below 3000, 7000 and 10,000 molecular weight, respectively. The fractions containing the largest molecular species were the most active. These were further purified by chromatography on columns of cellulose modified to act as anion exchangers.

The fractions eluted from the modified cellulose columns with buffer solutions were freeze-dried and afforded colorless powders active against tumors S–180, Ca 755, and Ehrlich's ascites at 1–2 mg./kg./day in tumor-bearing mice. This material gave positive Molisch, anthrone, Taubers' resorcinol and aniline acetate tests. The Barfoed, Benedict and Seliwanoff tests were negative. The material decolorized bromine and alkaline permanganate solution. The ninhydrin and Sakaguchi tests were positive; the Elson-Morgan and Morgan-Elson tests were slightly positive; the xanthoprotein test was negative.

The active principle actinogan appears to be a large molecule of carbohydrate rather than peptide nature and is precipitated by some but not all protein precipitants; it is fairly stable under laboratory conditions, to pH changes between 4–9, and to heating at 50° C., but is deactivated at 100° C. and has a molecular weight in excess of 7,000–10,000 as indicated by failure to be retained on Sephadex G75 (a cross-linked dextran gel which excludes materials with a molecular weight greater than 7,000 to 10,000).

The following example is for purposes of illustration only and not of limitation and illustrates the recovery of the polysaccharide of the present invention from a fermentation broth.

EXAMPLE 3

*Isolation and Purification of Actinogan*

Broth prepared as above was centrifuged, the clear broth thus obtained was saturated with ammonium sulfate and the precipitate of crude actinogan was separated by centrifugation. The crude actinogan solids were dissolved in a minimum amount of distilled water and dialyzed in cellulose acetate tubing against tap water for six hours. Portions of the solution were freeze-dried (to give solid G21) or diluted with addition of four volumes of acetone (to give solid G23).

The solid obtained by acetone precipitation was dissolved in a minimum amount of water and passed through a column of Sephadex G25. The latter is a commercially available, cross-linked dextran polymer which forms a gel with water and acts as a molecular sieve, absorbing molecules smaller than about 3,000 molecular weight. A column 3″ in diameter and 7″ in length containing a gel prepared from 100 gm. Sephadex G25 was charged with 180 ml. of a saturated solution of the twice precipitated solids (G 23). The first 200 ml. of the effluent were discarded and the next 200 ml. were freeze-dried (to give solid actinogan, sample G27).

In an attempt to utilize the molecular sieve columns for further purification, a gel of larger pore size (G50) was also employed. Sephadex G50 absorbs polyglucose molecules below molecular weight 7000. The fractions containing the largest molecules showed the greatest activity but even the ones containing the smallest molecules had some activity (G36–41).

The activities as determined by S–180 assay in mice were as follows:

| Solid Material Tested | Activity (as T/C ratio) | | | | | | |
|---|---|---|---|---|---|---|---|
| | Dosage [1] | | | | | | |
| | 32 | 16 | 8 | 4 | 2 | 1 | 0.5 |
| Am. sulfate ppte. G21 | – | toxic | .52 | .83 | – | – | – |
| Am. sulfate ppte. G23 | toxic | .28 | .20 | .68 | .85 | – | – |
| Sephadex 3000 G27 | toxic | toxic | toxic | .09 | .45 | .73 | .86 |
| Molecular weight of Sephadex Fractions: | | | | | | | |
| Greater than 7,000, G36 | – | – | – | .19 | .37 | – | – |
| Greater than 3,000, G37 | – | – | – | .07 | .45 | – | – |
| Approximately equal to 3,000, G38 | – | – | toxic | – | .57 | – | – |
| Less than 3,000, G39 | – | – | toxic | – | .65 | – | – |
| Last eluate, G41 | – | – | .81 | – | – | – | – |

[1] As mkd., that is, milligrams actinogan solids per kilogram of mouse per day. A hyphen in the table signifies not tested at that dosage.

The starting broth gave the following T/C ratios (with the dilution given in parentheses): toxic (1/32); 0.75 (1/64) and 0.91 (1/25).

Actinogan stimulates the host defense mechanism and stimulates antibody production. Thus when a "weak" antigen is given to produce antibodies, the administration of actinogan leads to the production of more antibodies. This is of value in assisting a search for a weak but non-toxic antibiotic. Actinogan is a useful tool for the study of factors involved in host resistance, antibody formation, the removal of particles from the blood stream by the reticuloendothelial system and the relation of the reticuloendothelial system to overcoming infections. Actinogan is thus used in elucidating body mechanisms in a manner similar to the use of bacterial endotoxins. Actinogan is also useful to potentiate relatively ineffective antibacterial agents, and especially antibiotics, in order to provide greater activity or to enable the use of lower doses.

Actinogan is a useful agent to cause the regression of certain tumors. When such regression has occurred in animals, the same strain of tumor can no longer be implanted. There is thus obtained for study in a practical, simple manner, a unique laboratory tested animal, i.e., one which is "resistant" to this particular tumor. There is thus provided for scientific study of detailed biochemical and physiological mechanisms a pair of otherwise apparently identical animals, one of which is resistant to the tumor and one of which (the untreated control) is not so resistant.

Actinogan is useful in man and animals to cause a partial or complete regression of certain tumors.

Actinogan is useful in man and animals by concomitant administration with autologous tumor vaccines.

The ability of the product of the present invention to increase the resistance of a host to infection was shown in the following experiment. The product of the present invention was injected once daily for three days into the peritoneal cavity of male albino mice (18–20 gram weight). On the third day immediately after the third drug injection, the mice were infected with *Staphylococcus aureus* (two clinical isolates which were highly resistant to benzylpenicillin and the tetracyclines) using an intraperitoneal injection of a suspension of the cocci in five percent hog gastric mucin. Response is judged by survival or death of the mice.

The results of two tests are shown in the table below:

| Product Dose (mg./kg./day) 3 daily injections | Challenge Organism (Infection at Time of 3rd Drug Treatment) | Response (Ratio, Deaths/ Total Mice) |
| --- | --- | --- |
| 5.0 | Staph. aureus (1633-2) | 0/5 |
| 1.0 | | 0/5 |
| 0.1 | | 1/5 |
| 0 | | 10/10 |
| 5.0 | Staph. aureus (52-75) | 0/5 |
| 1.0 | | 0/5 |
| 0.1 | | 2/5 |
| 0 | | 9/10 |

Tests of this product did not show protective action when a single dose was given at the time of mouse infection. Tests made by reinfecting surviving mice in the experiments shown in the above table indicated that the protective action of the multiple dose treatment persisted for at least six days following drug injection.

The above procedure can also be used as an assay method for the product of the present invention.

We claim:

1. The process of producing a complex polysaccharide, identified as actinogan, which comprises cultivating the micro-organism ATCC 13748 under submerged aerobic conditions in an aqueous carbohydrate solution containing a nitrogenous nutrient until substantial activity versus Sarcoma 180 is produced in said medium.

2. The process of producing a complex polysaccharide, identified as actinogan, which comprises cultivating the micro-organism ATCC 13748 under submerged aerobic conditions in an aqueous carbohydrate solution containing a nitrogenous nutrient at a temperature of substantially from 22° to 32° C. and for between about one and five days.

3. The process of producing a complex polysaccharide, identified as actinogan, which comprises cultivating the micro-organism ATCC 13748 under submerged aerobic conditions in an aqueous carbohydrate solution containing a nitrogenous nutrient until substantial activity versus Sarcoma 180 is produced in said medium and then recovering from the broth the actinogan thus produced.

4. A new biologically active substance identified as actinogan which is prepared by the process of claim 1.

References Cited in the file of this patent

UNITED STATES PATENTS 2,449,866    Waksman et al. _____ Sept. 21, 1948

OTHER REFERENCES

Kent et al.: Biochemistry of the Aminosugars, Academic Press, Inc., 1955, pp. 141-145.